United States Patent Office 2,731,470
Patented Jan. 17, 1956

2,731,470

N-PYRIDYLMETHYL, N-HYDROXYETHYL DIHALO ACETAMIDES

Edward F. Elslager and Franklin W. Short, St. Clair Shores, and Elinor S. Lademan, Detroit, Mich., assignors to Parke, Davis & Company, Detroit, Mich., a corporation of Michigan No Drawing. Application December 23, 1954,
Serial No. 477,409

10 Claims. (Cl. 260—295)

This invention relates to new chemical compounds and to methods for producing the same. More particularly, the invention relates to dihalo-N-(β-hydroxyethyl)-N-(pyridylmethyl)-acetamides and their acid addition salts. In free base form these new compounds have the general formula,

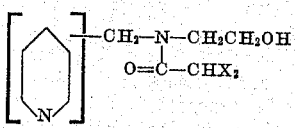

wherein X represents a bromine or chlorine radical.

As indicated in the above formula, the point of attachment of the methylene group to the pyridine nucleus of the new compounds may be in the alpha, beta or gamma position. The compounds of the invention are effective in combatting, both in vitro and in vivo, the organism which causes amebiasis, namely E. histolytica. The compounds are effectively administered in suitable oral dosage form. The preferred compounds of the invention are those in which X represents a chlorine radical and in which the pyridine nucleus is attached in the beta or gamma position. The new compounds may be employed in either the free base or acid addition salt form. Salts of any relatively non-toxic organic or inorganic acid are in general suitable. Some typical examples of these salts are the hydrochloride, hydrobromide, sulfate, phosphate, oxalate, sulfamate, sulfonate, acetate, lactate, tartrate, gluconate, pamoate (2,2'-dihydroxy-1,1'-dinaphthylmethane-3,3'-dicarboxylic acid salt), citrate, salicylate, benzoate and naphthoate. The acid addition salts are prepared from the free bases by reacting the same with the appropriate acid under substantially anhydrous conditions preferably in the cold in the presence of an inert organic solvent.

In accordance with the invention the above dihalo-N-(β-hydroxyethyl)-N-(pyridylmethyl)-acetamides are produced by reacting a β-(pyridylmethylamino)ethanol compound of formula,

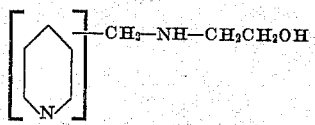

with a dihaloacetylating agent under mild acylating conditions. Among the dihaloacetylating agents which can be employed are the alkyl esters of dihaloacetic acid, dihaloacetic anhydrides, dihaloacetyl halides, chloral cyanhydrin, and chloral in the presence of an alkaline earth or alkali metal cyanide.

Where a dihaloacetyl ester is used as the dihaloacetylating agent the optimum reactions are contingent upon the reactivity of the ester per se. Thus, the lower alkyl esters are more active than the higher alkyl esters and are, therefore, the preferred type. The methyl esters are the preferred members of the lower alkyl types. In the case of methyl dichloroacetate the reaction is substantially complete within twenty-four hours at a temperature of 25° C. Preferably, the reaction with the dihaloacetyl esters is carried out in the presence of an anhydrous organic solvent. Some suitable solvents for this purpose are the lower aliphatic alcohols such as methanol and ethanol, lower aliphatic ketones such as acetone and methyl ethyl ketone, cyclic ethers such as dioxane, hydrocarbons such as benzene and toluene, tertiary amides such as dimethyl formamide, and halogenated aliphatic hydrocarbons such as ethylene dichloride and chloroform.

When the dihaloacetylation is carried out using a dihaloacetyl anhydride or halide the temperature is preferably kept below about 35° C. It is also preferable from the standpoint of increased yields and ease in controlling the temperature to carry out the reaction in an organic solvent. Some solvents which are suitable for this purpose are the lower aliphatic alcohols such as methanol and ethanol, lower aliphatic ketones such as acetone and methyl ethyl ketone, cyclic ethers such as dioxane, hydrocarbons such as benzene and toluene, tertiary amides such as dimethyl formamide, and halogenated aliphatic hydrocarbons such as ethylene dichloride and chloroform. The reaction using a dihaloacetyl anhydride or halide is carried out in the presence of a basic catalyst. Some examples of suitable basic catalysts for this purpose are the organic bases such as pyridine, N-ethyl morpholine and triethylamine and inorganic bases such as the alkali metal acetates, bicarbonates, carbonates, hydroxides and phosphates and alkaline earth hydroxides, etc.

In carrying out the process using a chloral derivative as the acylating agent, chloral cyanhydrin itself can be used or, if desired, it can be produced in situ by the reaction of chloral or its hydrate with an alkali metal cyanide. In the latter case employing chloral or its hydrate, it is sufficient to employ only a small amount of the alkali metal cyanide because it is continuously regenerated during the course of the reaction. As solvents for the reaction, water, cyclic ethers such as dioxane, lower aliphatic alcohols such as methanol and ethanol and tertiary amines such as triethylamine can be suitably employed. The reaction is carried out in the presence of a basic catalyst. When a tertiary organic amine is employed as the reaction solvent, it can also function as the basic catalyst. Some examples of basic catalysts which are satisfactory are alkali and alkaline earth metal carbonates, alkaline earth metal oxides, alkali and alkaline earth metal hydroxides, trialkylamines and heterocyclic amines. Some specific examples of these substances are potassium carbonate, sodium carbonate, calcium carbonate, magnesium oxide, sodium hydroxide, potassium hydroxide, triethylamine, trimethylamine, pyridine and quinoline. Where chloral cyanhydrin is employed as a reactant, it is preferable to use an anhydrous organic medium such as dioxane or a tertiary organic amine. Where chloral or its hydrate is employed, it is preferable to use an aqueous medium in conjunction with an inorganic base.

The process employing a chloral derivative can be carried out at temperature below about 100° C. When free chloral cyanhydrin is employed as a starting material, it is preferable to employ a reaction temperature in the range of about 0 to 25° C. When chloral in the presence of an alkaline metal cyanide catalyst is employed, the reaction is advantageously carried out at a temperature in the range of about 60 to 100° C. The process employing the dihaloacetyl ester, anhydrides or halides can also be carried out at temperature below about 100° C. and preferably between 15 to 35° C.

In carrying out the process, the relative proportions of the starting materials, β-(pyridylmethylamino)ethanol and dichloroacetylating agent, may be varied widely.

Satisfactory results are obtained by employing equimolar proportions but for reasons of economy, it is preferable to employ an excess of as much as one equivalent of the more readily available dichloroacetylating agent.

The invention is illustrated by the following examples:

Example 1

(a) A mixture of 26 g. of β-(γ-pyridylmethylamino)-ethanol, 100 ml. of ethylene dichloride and 25 ml. of methyl dichloroacetate is stirred at 23–25° C. for twenty-four hours. The ethylene dichloride and excess methyl dichloroacetate are removed in vacuo at 40–60° C. and the reaction mixture is allowed to cool. The residual solid is slurried with petroleum ether, filtered and recrystallized from absolute ethanol. The crystalline product is 2,2-dichloro-N-(β-hydroxyethyl)-N-(γ-pyridylmethyl)-acetamide; M. P. 130–132° C. This product has the formula,

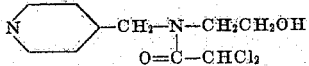

(b) A solution of 0.5 g. of the product of (a) is dissolved in 50 ml. of dry chloroform and the solution is saturated with gaseous hydrogen chloride in the cold. The resulting oily product is separated and is triturated with cold dry ether to produce the desired 2,2-dichloro-N-(β-hydroxyethyl)-N-(γ-pyridylmethyl)-acetamide, hydrochloride, monohydrate; M. P. 143–144° C. This product has the formula,

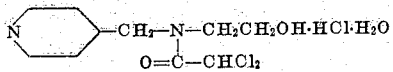

(c) 1 gram of the product of (a) is dissolved in 80 ml. of dry chloroform and the resulting solution is treated with 1 ml. of concentrated sulfuric acid. The white precipitate which forms is collected by filtration and washed with cold chloroform. The product obtained is the sulfuric acid addition salt of 2,2-dichloro-N-(β-hydroxyethyl)-N-(γ-pyridylmethyl)-acetamide.

β-(γ-pyridylmethylamino)ethanol, used as a starting material in (a) above, can be prepared as follows: 25.3 g. of β-ethanolamine is added slowly to a solution of 44.5 g. of pyridine-4-aldehyde in 100 ml. of benzene. A nitrogen atmosphere is employed to prevent oxidation of pyridine-4-aldehyde. After the addition the reaction mixture is heated to reflux for three hours. The water evolved is collected in a water trap. The mixture is then stirred at 23–25° C. for 16–18 hours and the benzene is removed in vacuo. The residual solid, β-(γ-pyridylmethyleneamino)ethanol, is recrystallized from benzene-petroleum ether. A mixture of 56.5 g. of the resulting β-(γ-pyridylmethyleneamino)ethanol, 200 ml. of 95% ethanol and 1 g. of 5% palladium-charcoal catalyst is placed in a low pressure hydrogenation apparatus and held under hydrogen pressure of 45 pounds for 26 hours. Additional catalyst is added as needed. Subsequently, the mixture is removed from the apparatus, the catalyst is filtered off, and the solvent is removed by vacuum distillation. The residue is subjected to vacuum distillation and the fraction boiling at 148–153° C. (0.7 mm.) is collected. This fraction is β-(γ-pyridylmethylamino)-ethanol; $n_D^{25}$, 1.5396.

Example 2

(a) A mixture of 82.5 g. of β-(β-pyridylmethylamino)-ethanol, 300 ml. of ethylene dichloride and 100 ml. of methyl dichloroacetate is stirred at 23–25° C. for twenty-four hours. The ethylene dichloride and excess methyl dichloroacetate are removed by vacuum distillation at 60° C. The residual mixture is allowed to cool and is triturated with petroleum ether until it solidifies. The resulting solid is recrystallized from a mixture of absolute ethanol and petroleum ether; M. P. 107–109° C. The product, 2,2-dichloro-N-(β-hydroxyethyl)-N-(β-pyridyl-methyl)acetamide, has the formula,

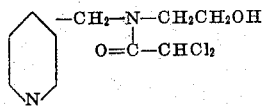

(b) 0.5 gram of the product of (a) is dissolved in 50 ml. of dry chloroform and the solution is treated with gaseous hydrogen chloride with cooling. The resulting oily product is isolated and is slurried with cold dry ether to produce the desired 2,2-dichloro-N-(β-hydroxyethyl)-N-(β-pyridylmethyl)acetamide, hydrochloride, monohydrate. This product has the formula,

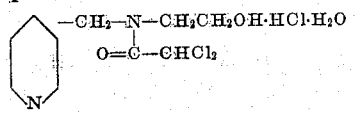

β-(β-pyridylmethylamino)ethanol, used as a starting material in (a) above, can be prepared as follows: 55 grams of β-ethanolamine is added slowly to a solution of 89 g. of pyridine-3-aldehyde in 250 ml. of benzene over a period of one hour. A nitrogen atmosphere is employed to prevent undesirable oxidation of pyridine-3-aldehyde. After the addition, the mixture is refluxed for four hours. The water evolved is collected in a moisture trap. The mixture is then stirred at 23–25° C. for 16–18 hours and the benzene removed in vacuo. The residue, β-(β-pyridylmethyleneamino)ethanol in crude form is dissolved in 400 ml. of 95% ethanol and reduced with hydrogen at 45 pounds per square inch pressure in the presence of 2 g. of 5% palladium-charcoal catalyst. The reaction mixture is then filtered to remove the catalyst and the ethanol is removed by vacuum distillation. The residue is distilled in vacuo and the fraction boiling at 143–150° C. (1.5 mm.) is collected. The product obtained is β-(β-pyridylmethylamino)ethanol; $n_D^{25}$, 1.5432.

Example 3

A solution of 147 g. of dichloroacetyl chloride and 50 ml. of acetone is added dropwise with stirring and cooling (0–5° C.) to 100 ml. of acetone containing 15.2 g. of β-(γ-pyridylmethylamino)ethanol and 30 ml. of pyridine. After the addition is complete, the reaction mixture is allowed to stand for 18–20 hours at 20–25° C. Subsequently, the mixture is poured into a large excess of cold water and made alkaline by the addition of sodium bicarbonate. The solid that precipitates on cooling is collected by filtration and washed with water. The product, 2,2-dichloro-N-(β-hydroxyethyl)-N-(γ-pyridylmethyl)acetamide, is purified by recrystallization from absolute ethanol; M. P. 130–132° C.

Example 4

To a stirred and refluxed mixture of 3 g. of β-(γ-pyridylmethylamino)ethanol, 2 g. of precipitated calcium carbonate, 0.4 g. of sodium cyanide and 10 ml. of water, a solution of 4.65 g. chloral hydrate in 2 ml. of water is added over a period of about 2–5 minutes. The reaction mixture is allowed to stir and reflux for 10 minutes and is then cooled. Sufficient hydrochloric acid is added to render the reaction mixture just neutral to Congo red paper. The resulting precipitate is filtered off and recrystallized from absolute ethanol to yield crystals of 2,2-dichloro-N-(β-hydroxyethyl)-N-(γ-pyridylmethyl)-acetamide having a melting point of 130–132° C.

Example 5

(a) A mixture of 15.2 g. of β-(γ-pyridylmethylamino)ethanol, 25.5 g. of methyl dibromoacetate and 100 ml. of absolute ethanol is refluxed for sixteen hours. The solvent and excess ester are removed by vacuum distillation and the residue cooled and washed thoroughly with petroleum ether. The semicrystalline residue is recrystallized from absolute ethanol to obtain 2,2-dibromo-N - (β - hydroxyethyl) - N - (γ - pyridylmethyl)acetamide. This product has the formula,

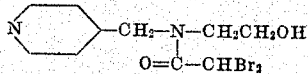

(b) 1 gram of the product of (a) is dissolved in 100 ml. of dry chloroform and the resulting solution is treated with gaseous hydrogen chloride. The resulting precipitate is collected by filtration. The product, 2,2-dibromo-N-(β-hydroxyethyl)-N-(γ-pyridylmethyl)acetamide, hydrochloride, has the formula,

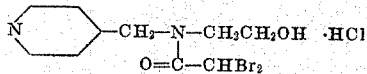

Example 6

A mixture of 114.2 g. of β-(α-pyridylmethylamino) ethanol, 370 ml. of ethylene dichloride and 150 ml. of methyl dichloroacetate is stirred at 23–25° C. for twenty-four hours. The solvent and excess ester are removed in vacuo at 40–60° C. and the residue is triturated with peroleum ether. The residual product is 2,2-dichloro-N-(β-hydroxyethyl)-N-(α-pyridylmethyl)acetamide. This product has the formula,

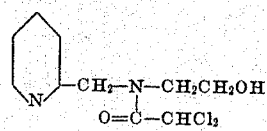

β-(α-pyridylmethylamino)ethanol, employed above as a starting material, can be prepared as follows: 105 g. of β-ethanolamine is added dropwise to 178 g. of pyridine-2-aldehyde in 400 ml. of benzene, in a nitrogen atmosphere. The mixture is refluxed for three and one-half hours and is then allowed to cool and stand for 16–20 hours at 20–25° C. without stirring. The solvent is removed and the crude β-(α-pyridylethyleneamino)ethanol is dissolved in 800 ml. of 95% ethanol and reduced with hydrogen at 45 pounds per square inch using 4 g. of 5% palladium-charcoal catalyst. The theoretical amount of hydrogen is absorbed in about 22–24 hours. The catalyst is filtered off and the solvent is removed from the filtrate by vacuum distillation. The residue is fractionally distilled. The fraction which collects at 129–140° C. (0.8–1.5 mm.) is the desired starting material, β-(α-pyridylmethylamino) ethanol.

Example 7

A solution of 15.2 g. of β-(γ-pyridylmethylamino)ethanol and 50 ml. of dimethylformamide is added to 50 g. of dichloroacetic anhydride and the mixture is heated on a steam bath for four hours. The reaction mixture is cooled and poured into approximately one liter of cold water. The resulting precipitate is filtered off, washed with water and recrystallized from absolute ethanol. The crystalline product is 2,2-dichloro-N-(β-hydroxyethyl)-N-(γ-pyridylmethyl)acetamide; M. P. 130–132° C.

We claim:

1. A compound of the class consisting of a free base and its acid addition salts, the said free base having the formula,

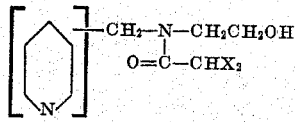

where X is a member of the class consisting of chlorine and bromide radicals.

2. A compound of the formula,

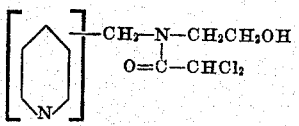

3. A compound of the formula,

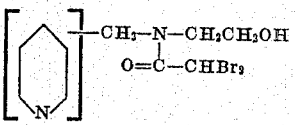

4. An acid addition salt of a compound of the formula,

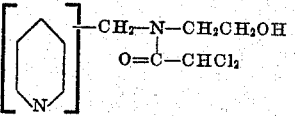

5. An acid addition salt of a compound of the formula,

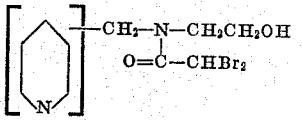

6. 2,2 - dichloro - N - (β - hydroxyethyl) - N - (γ - pyridylmethyl)acetamide.

7. 2,2 - dichloro - N - (β - hydroxyethyl) - N - (β-pyridylmethyl)acetamide.

8. 2,2 - dibromo - N - (β - hydroxyethyl) - N - (γ-pyridylmethyl)acetamide.

9. 2,2 - dibromo - N - (β - hydroxyethyl) - N - (β-pyridylmethyl)acetamide.

10. A hydrochloric acid addition salt of 2,2-dichloro-N - (β - hydroxyethyl) - N - (γ - pyridylmethyl) acetamide.

No references cited.